(12) United States Patent
Deel et al.

(10) Patent No.: US 8,554,043 B2
(45) Date of Patent: Oct. 8, 2013

(54) ADAPTABLE CONNECTION ENCLOSURE

(75) Inventors: Adam Deel, North Olmstead, OH (US); Randy Cloud, Mentor, OH (US); Chris Grubish, Solon, OH (US)

(73) Assignee: Preformed Line Products Company, Mayfield Village, OH (US)

( * ) Notice: Subject to any disclaimer, the term of this patent is extended or adjusted under 35 U.S.C. 154(b) by 278 days.

(21) Appl. No.: 13/081,456

(22) Filed: Apr. 6, 2011

(65) Prior Publication Data
US 2012/0257862 A1 Oct. 11, 2012

(51) Int. Cl.
*G02B 6/00* (2006.01)
*G02B 6/36* (2006.01)

(52) U.S. Cl.
USPC ............................................ 385/135; 385/92

(58) Field of Classification Search
USPC ................................................. 385/92, 135
See application file for complete search history.

(56) References Cited

U.S. PATENT DOCUMENTS

| | | | |
|---|---|---|---|
| 2002/0159745 A1* | 10/2002 | Howell et al. ................. | 385/135 |
| 2005/0141828 A1* | 6/2005 | Narayan et al. ................. | 385/92 |
| 2010/0158465 A1* | 6/2010 | Smrha ........................... | 385/135 |
| 2012/0141084 A1* | 6/2012 | Zoss et al. ..................... | 385/135 |

* cited by examiner

*Primary Examiner* — Ryan Lepisto
*Assistant Examiner* — Jerry Blevins
(74) *Attorney, Agent, or Firm* — Kegler Brown Hill & Ritter; James J. Pingor (57) ABSTRACT

An adaptable connection enclosure (ACE) is disclosed. The ACE can employ a number of different connector blocks thereby enhancing versatility to address a myriad of different connection scenarios. In aspects, the ACE can support coax, coax/fiber, coax/CAT5, fiber/CAT5, fiber or CAT5 connector blocks without altering the ACE housing. In accordance therewith, adapter plates can be employed to effect the interchangeability.

19 Claims, 12 Drawing Sheets

FIG. 12

ADAPTABLE CONNECTION ENCLOSURE

BACKGROUND

Major telecommunications service providers and system vendors, began installing fiber optics to home architectures in the 1990s. This addition of fiber optic cabling into telecommunications added yet another communication medium to the telecommunications industry. More particularly, fiber optics (or 'fiber') was added in addition to standard coaxial (or 'coax') cabling. Category 5 (or CAT5) cabling was also introduced into the telecommunications industry as an alternative to traditional coax.

Many homes and apartments, probably 85-90% of any dwellings today, are wired with coax because the cable television companies and contractors pre-wired most all dwellings in the beginning. However, with the addition of fiber, when companies bring fiber into a dwelling it becomes inefficient and costly to rewire every room in a home with the fiber infrastructure.

To address this issue, companies often employ desktop ONTs (optical network terminals). The desktop ONTs allow service providers to deliver true fiber to the home, e.g., in an MDU (multiple dwelling unit), without a need to install an industrial looking hardware units inside the home. The desktop ONT converts the optical signal to an analog signal that can be transitioned on coax within the home or MDU.

Thus, fiber can enter the home from the outside and be connected to the desktop ONT, which has an output of coax. The coax is usually fed back out of the dwelling, into an exposed splitter and through the rest of the dwelling. One dilemma is that in many cases a coax splitter is needed to transition throughout the dwelling. In many instances, the splitter is merely hung from the outside wall at the point of connection so as to effect the distribution. This is unsightly and sometimes conflicts with housing code.

A similar situation can happen with CAT5 and other types of cabling. Thus, there is a need in the art to provide a versatile and adaptable connection enclosure (ACE) that can be used in a variety of cabling connection scenarios.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises an adaptable connection enclosure (ACE) that can be used alone or stackable with an existing enclosure, e.g., fiber wall plate. The connection enclosure includes a variety of interchangeable connection blocks. In aspects, a variety of corresponding adapter plates can be slidably positioned or used to affix each of the connection blocks within the connection enclosure as appropriate. The connector blocks can accommodate most any cabling connection including, but not limited to coaxial, fiber optic or CAT5, and combinations thereof.

Additionally, a user can change to a different type of connection without altering the footprint of an existing enclosure. Because coax is bulky and sometimes difficult to coil, aspects of the innovation essentially expand on the cavity of a fiber enclosure thereby addressing existing installs (e.g., by stacking a traditional fiber box on top of the ACE of the innovation).

In yet other aspects, because some dwellings are wired with CAT5, usually newer homes, one could still network the remainder of the house by a single jack because an ONT also has an output for a CAT5 that could be jumpered back into the network. The ACE described herein is capable and interchangeable so as to provide an ability to transition to CAT5 (to/from fiber or coax) as needed.

In addition to interchangeable connector blocks and adapters, the ACE can be equipped with an optional fiber splice tray. The splice tray can accommodate field repairs, expansion, etc. As stated above, the innovation is capable of retaining the footprint of an existing fiber box so as to enhance the ability of retrofits.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

Figure 1:
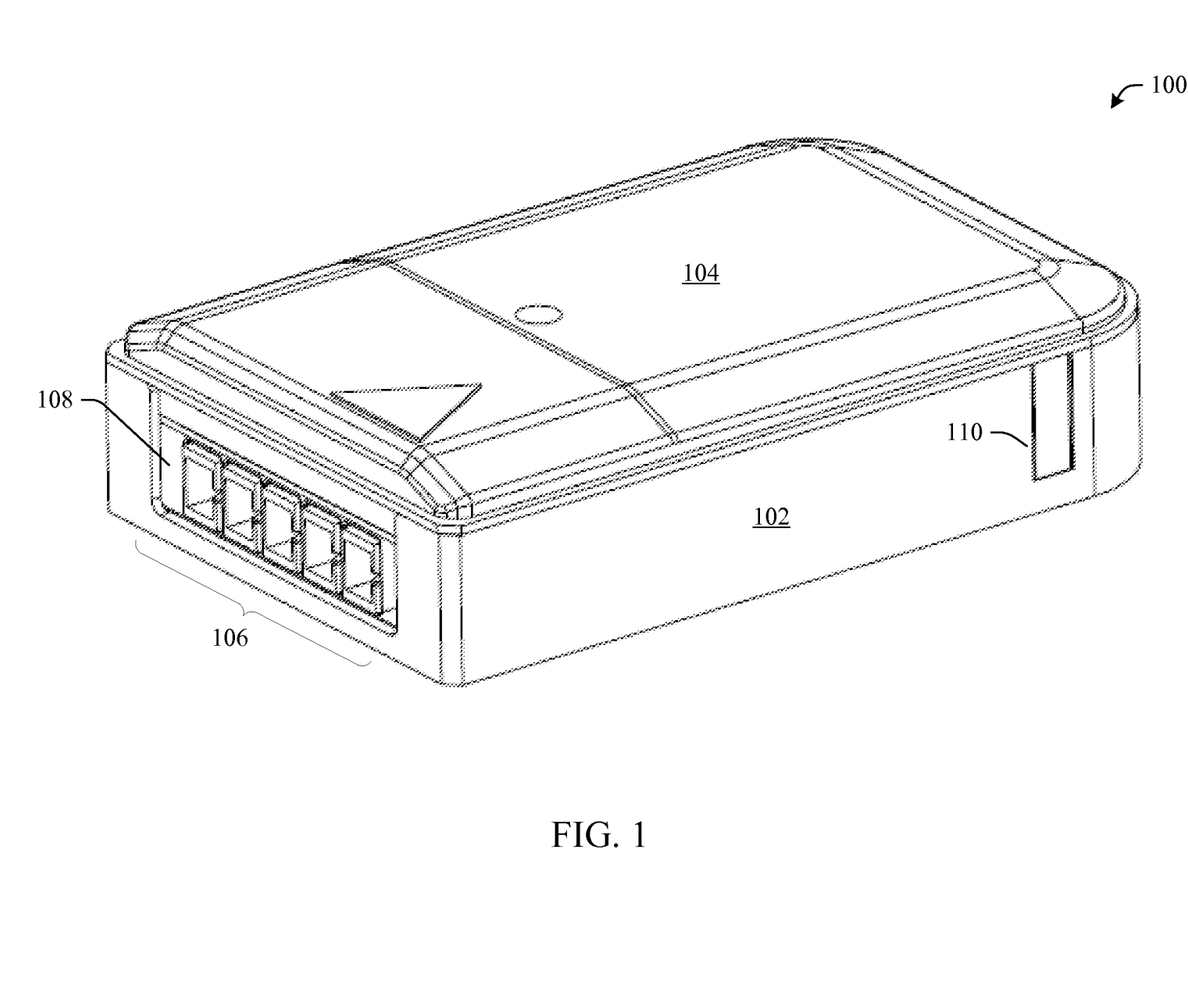
FIG. 1 illustrates a right perspective view of an adaptable connection enclosure (ACE) having fiber connections in accordance with aspects of the innovation.

Referring initially to the drawings, FIG. 1 illustrates an adaptable connection enclosure (ACE) 100 in accordance with an aspect of the innovation. Generally, the enclosure 100 includes a base portion 102 and a cover portion 104. As will be understood, the ACE 100 (as well as other embodiments described and contemplated herein) can be configured as a surface- or wall-mount enclosure as desired or appropriate. Further, it will be understood that the features, functions and benefits of the innovation enable adaptability to accept coax (coaxial cable), fiber (fiber optic cable) or CAT5 (category 5 cable) connections, including combinations thereof.

In doing so, the innovation discloses an ability to effect connections in accordance with a particular application. For example, the ACE 100 can be equipped with fiber connectors (or connection blocks) 106 as shown. As will be understood upon a review of the figures that follow, these connectors 106 can be swapped for most any appropriate connectors including, but not limited to, coax, CAT5 or combinations thereof.

An adapter plate 108 can be employed to accommodate a desired connector block 106. In an aspect, the adapter plate 108 can be slidably positioned into a cutout of the housing or base 102 as shown. This slidable connection will be better understood upon a review of FIG. 2. While a particular adapter plate connection is shown and described, it is to be understood that most any connection type can be employed in other aspects without departing from the features functions and benefits of the innovation. Similarly, while the adapter plate 108 is shown distinct from connector block 106, it will be understood that other aspects can be configured that employ a single/combined connection block/adapter plate unit that is capable of attachment and adaptability as described herein.

With continued reference to FIG. 1, the base 102 can be molded or otherwise configured with "breakouts," "knock-outs," cut-outs, or removable inserts (e.g., plastic inserts) 110 that enable variable mounting applications (e.g., surface mount). While a specific location of a cut-out is shown, it will be understood that cut-outs can be positioned in most any location in other embodiments.

Figure 2:
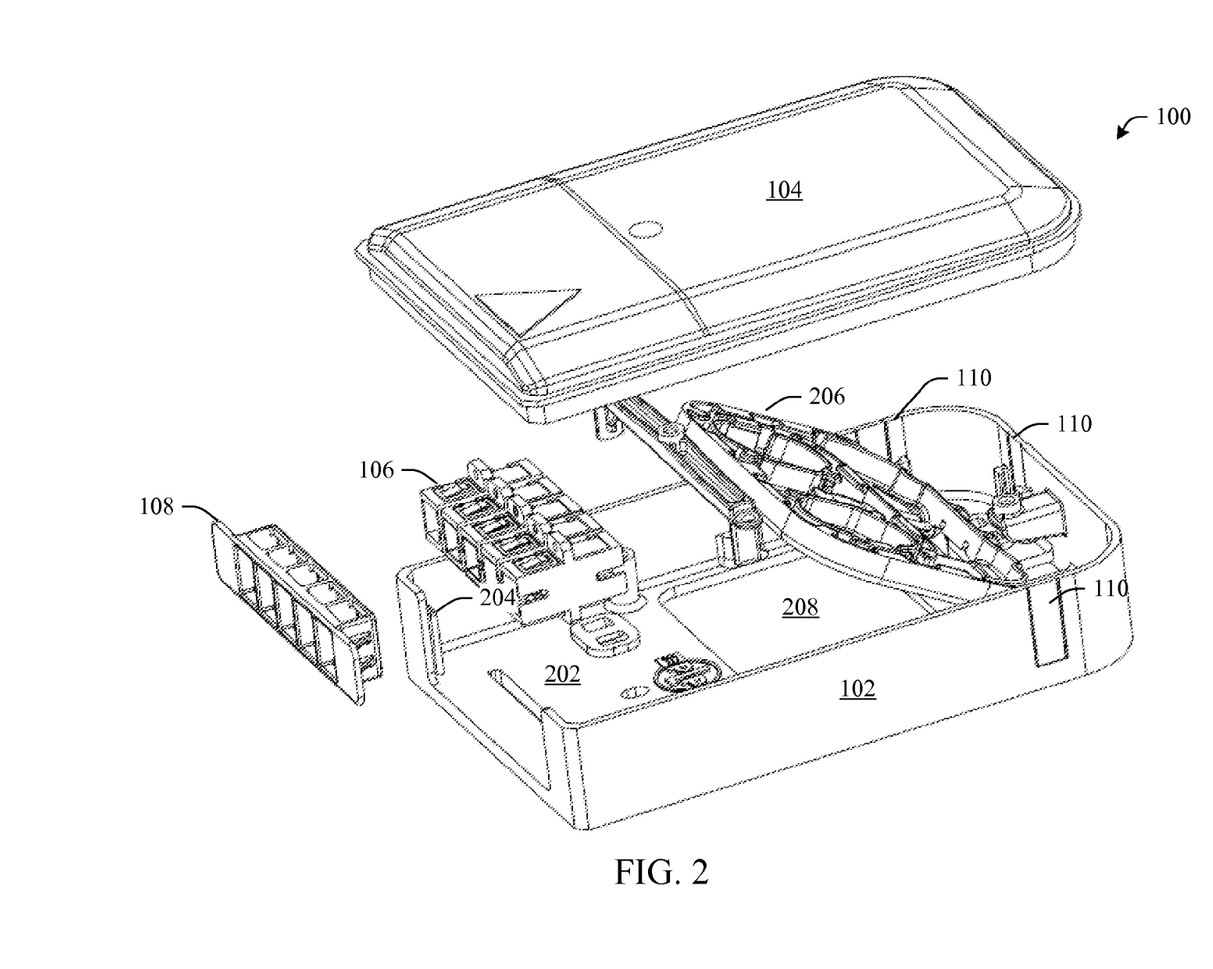
FIG. 2 illustrates an exploded view of the ACE of FIG. 1.

Turning now to FIG. 2, an exploded view of ACE 100 is shown. Consistent with FIG. 1, base portion 102 can be configured having a bottom side configured to fixedly or removably accept components of the ACE 100. For example, adapter plate 108 and/or connector block 106 can be slidably mounted into tracks or guides 204. As well, the inner bottom surface 202 can be configured with attachment means so as to accept and connect an optional splice or storage tray 206. It will be understood that most any attachment means, including but not limited to, snaps, friction pins, adhesives tabs, or the like can be employed in other aspects.

As shown, the base 102 can have a bottom surface 202, and four sidewalls as shown. Alternative configurations (e.g., sidewall cutouts) are contemplated and are to be included within this disclosure. As illustrated, the bottom surface 202, together with the sidewalls, forms a cavity within the housing whereby connector components (e.g., 106, 206) can be housed. In operation, the base 102 can be molded or manufactured from most any suitably rigid material including, but not limited to, plastics, composites, metals, or the like.

A sidewall can be equipped with a void, aperture or cutout whereby the adapter 108 or connector block 106 (or other adapter/connector block) can be installed. As shown, tracks or guides 204 can be molded into a surface of the aperture wall such that an adapter plate 108 (or connector block 106) can be slidably connected.

The lid or cover portion 104 can be configured with a size and shape that mates to the open face of the base 102. In aspects, a sealing mechanism (not shown) (e.g., hermetical seal) can be provided so as to enhance environmental protection. The cover 104 can be attached by way of standard hardware (e.g., screw(s)) or alternatively snap fit as appropriate. Other aspects can employ other attachment mechanisms (e.g., brackets or the like).

In still other aspects, as shown in the figures that follow, the lid portion 104 can be replaced with a connection enclosure. In this arrangement, the enclosures can be stacked thereby enhancing versatility and retrofit capabilities of the unit. In this stackable arrangement, it will be appreciated that the footprint of the enclosure is not increased, enhancing applicability in countless scenarios.

With continued reference to FIG. 2, as described above, the base 102 can be equipped with a variety of cut-outs 110. These cut-outs, break-outs or knock-outs 110 can facilitate surface mounting where appropriate. Additionally, as shown, base 102 can be equipped with a bottom surface 202 having an aperture 208 therein. This aperture 208 can facilitate face mounting upon a wall or surface whereby the cables enter/exit through the bottom surface 202—as opposed to surface mounting where cables enter/exit through the knock-outs 110.

Figure 3:
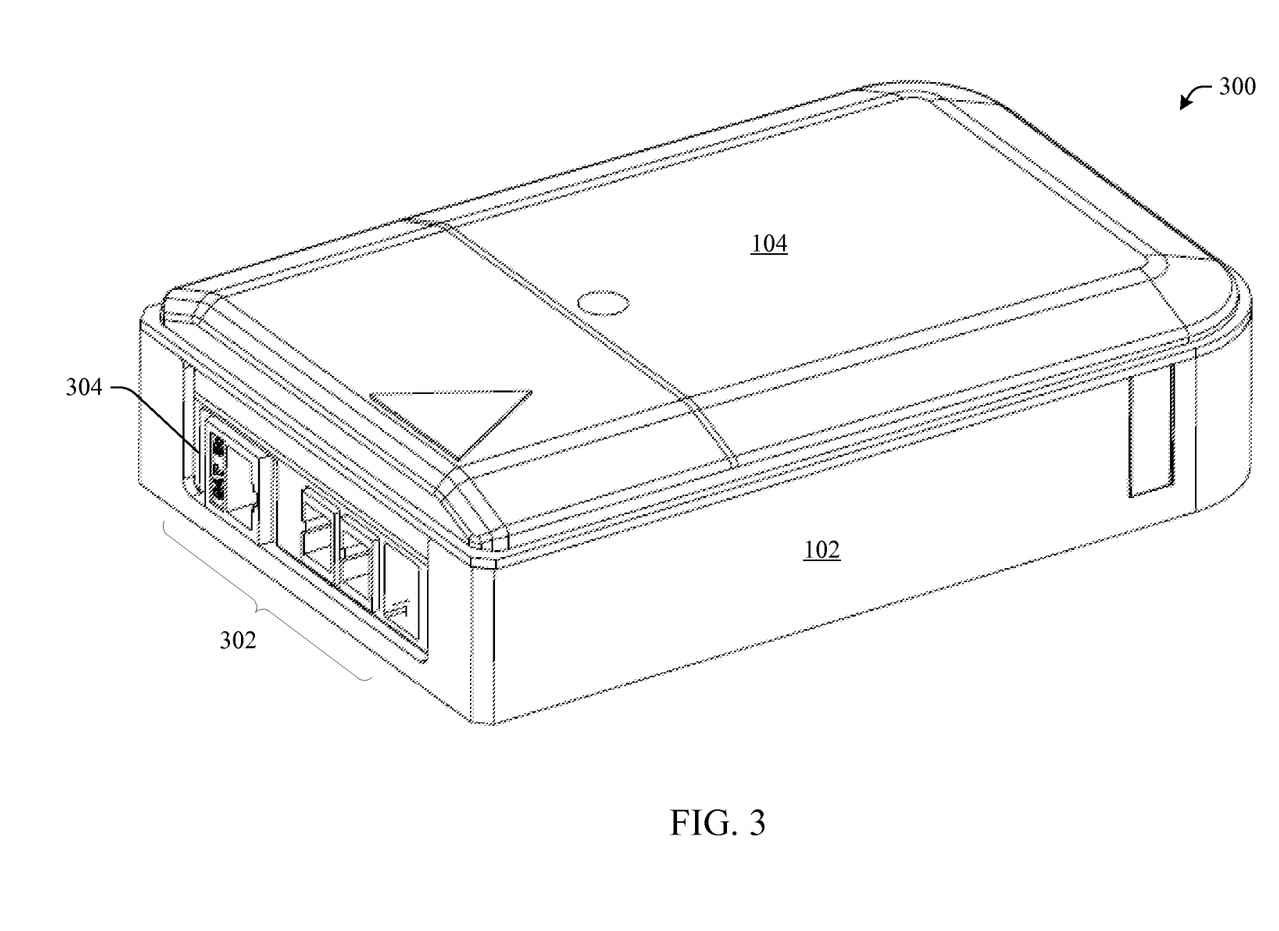
FIG. 3 illustrates a right perspective view of an ACE having CAT5 and fiber connections in accordance with aspects of the innovation.

Referring now to FIG. 3, an alternative aspect of an adaptable connection enclosure (ACE) 300 is shown. As illustrated, the enclosure 300 can employ the same (or similar) base unit 102 and cover unit 104 as shown in previous figures. However, because the unit is "adaptable," alternative connector block 302 can be installed so as to enable connection different from that of FIG. 1. As described herein, connector block 302 can include a mixed block of CAT5 and fiber connectors. Other aspects can include most any combination of CAT5, fiber and coax, as well as each individually as desired.

In order to effect variations or "adaptability," the embodiment of FIG. 3 can employ an adapter plate 304, in this scenario, designed for the CAT5 and fiber combination. As will be understood, other adapter plates can be included that correspond to alternative connector blocks (some of which are shown in the figures that follow).

Figure 4:
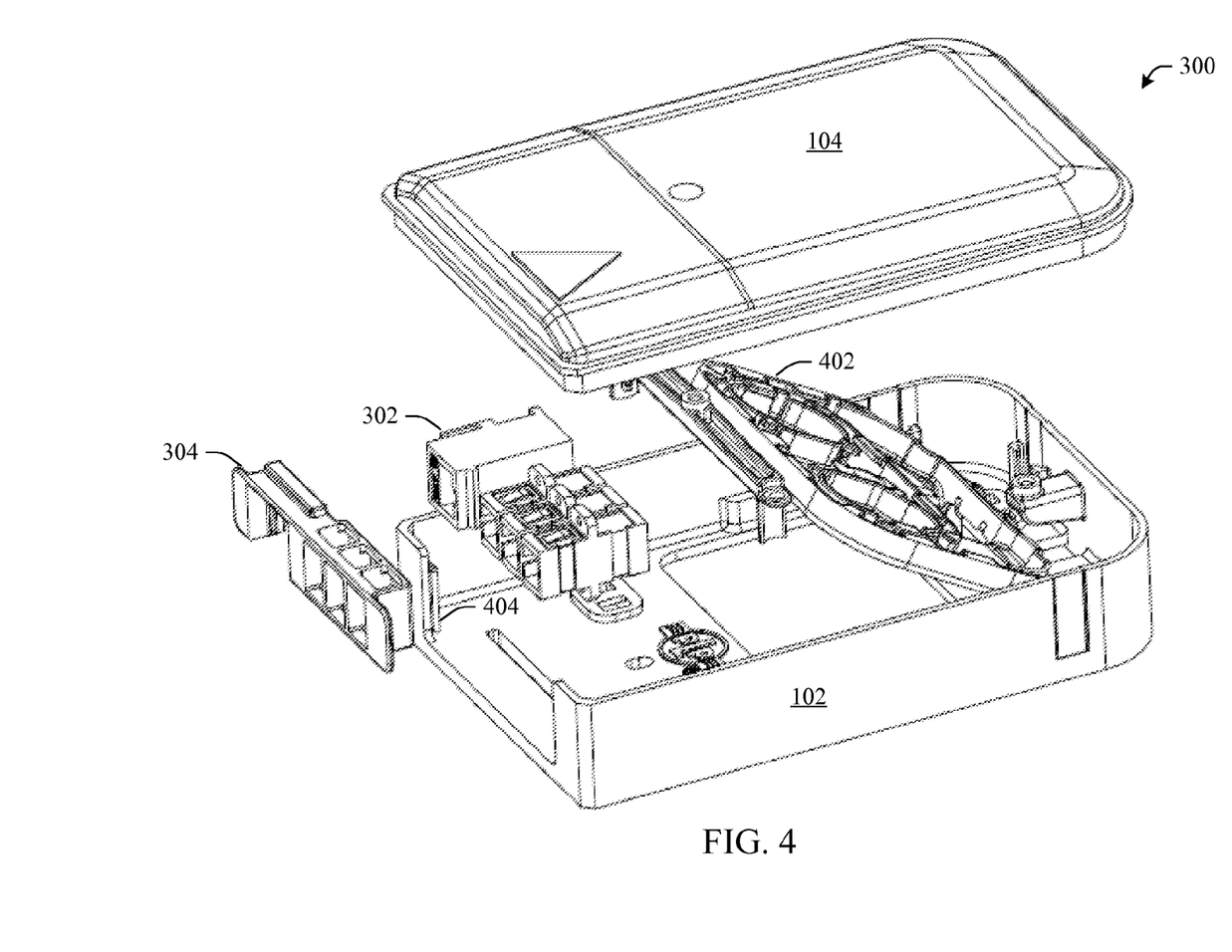
FIG. 4 illustrates an exploded view of the ACE of FIG. 3.

As described above and as shown in FIG. 4, an optional fiber splice tray 402 can be included within the cavity of housing 102 as shown. Further, the aperture of housing 102 can include a set of guides 404 capable of slidably attaching adapter 304. As well, it will be understood and appreciated that the guide (or other attachment means) can enable interchangeability of adapter plates (e.g., 304) and connector blocks (e.g., 302).

Figure 5:
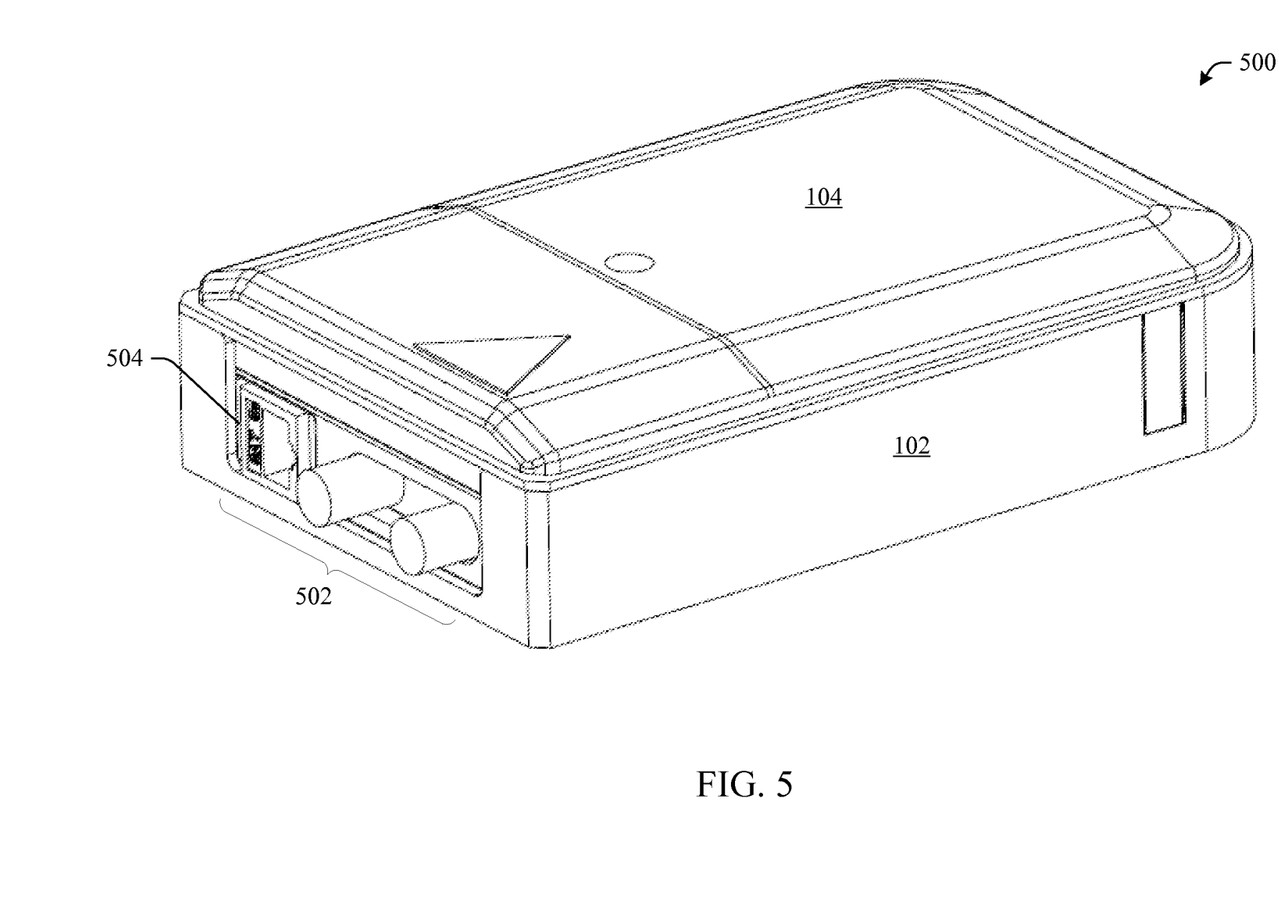
FIG. 5 illustrates a right perspective view of an ACE having CAT5 and coax connections in accordance with aspects of the innovation.

FIG. 5 illustrates yet another aspect of the innovation wherein an alternative connector block 502 can be employed with base and cover units 102 and 104 respectively. As shown, connector block 502 employs a single CAT5 along with a dual port OR 1×2 (1 input 2 outputs) coax connector. Adapter plate 504 can be slidably connected into a molded guide of the base 102, whereby the guide or track means can be molded into a sidewall of an aperture of base unit 102. This connection will be better understood upon a review of FIG. 6 that follows.

Figure 6:
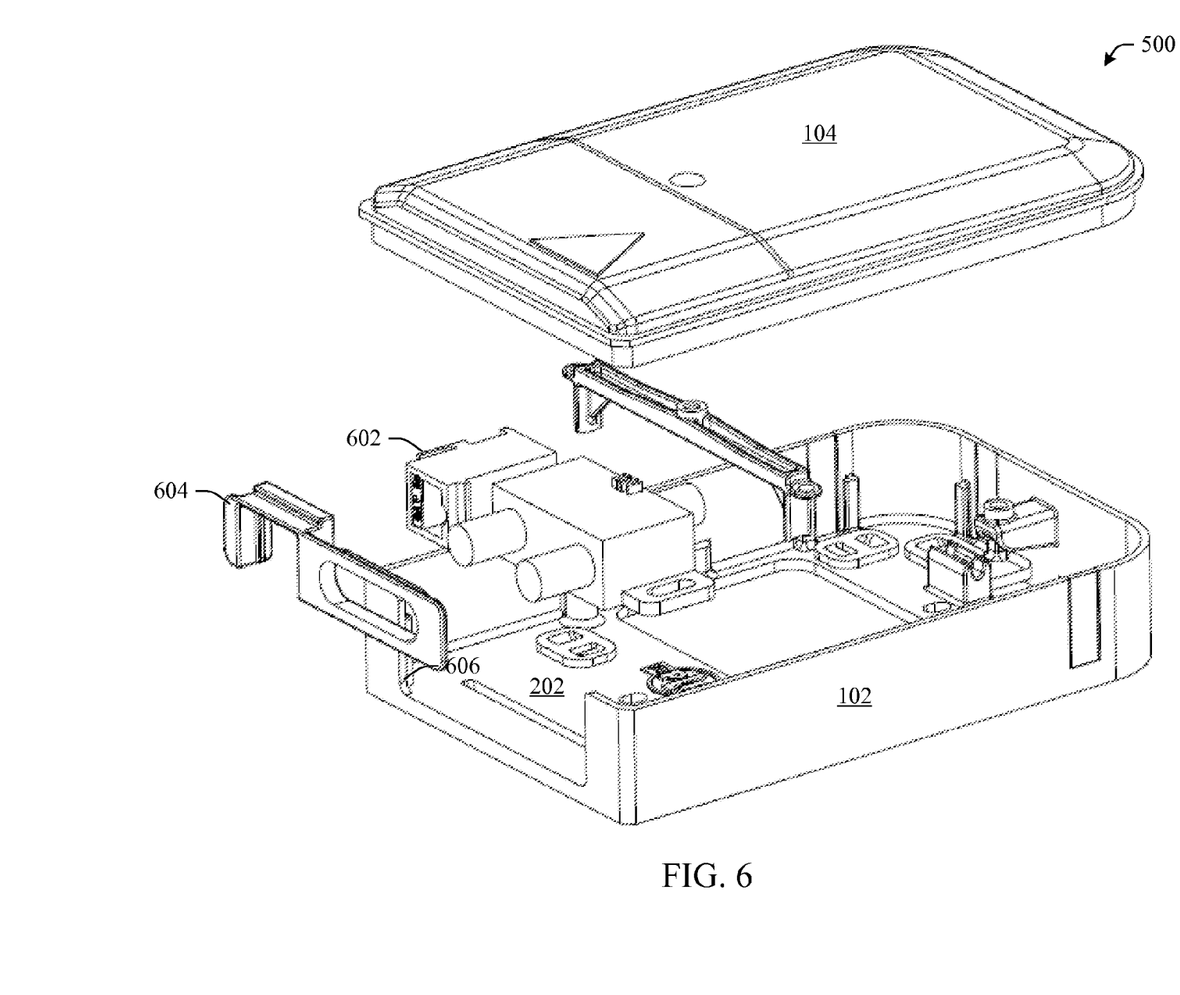
FIG. 6 illustrates an exploded view of the ACE of FIG. 5.

Turning now to FIG. 6, an exploded view of ACE 500 is shown. As illustrated in FIG. 6, consistent with the aforementioned embodiments, connector block(s) 602 can be mounted onto the inner wall of the bottom surface 202. In other words, the connector block(s) 602 are fixedly (or removeably) affixed within the cavity of base unit 102. In accordance therewith, an adapter plate 604, configured to match the connector block(s) (e.g., 602) can be slidably affixed within the aperture of base unit 102 via guide means 606. As shown, it is to be appreciated that "mixed" connector blocks (e.g., 602) can essentially be separate connector blocks as illustrated. This "mixed" block configuration facilitates adaptability and modular functionality of the innovation. In other aspects, a single unit block (not shown) can be employed having mixed connectors as desired.

Figure 7:
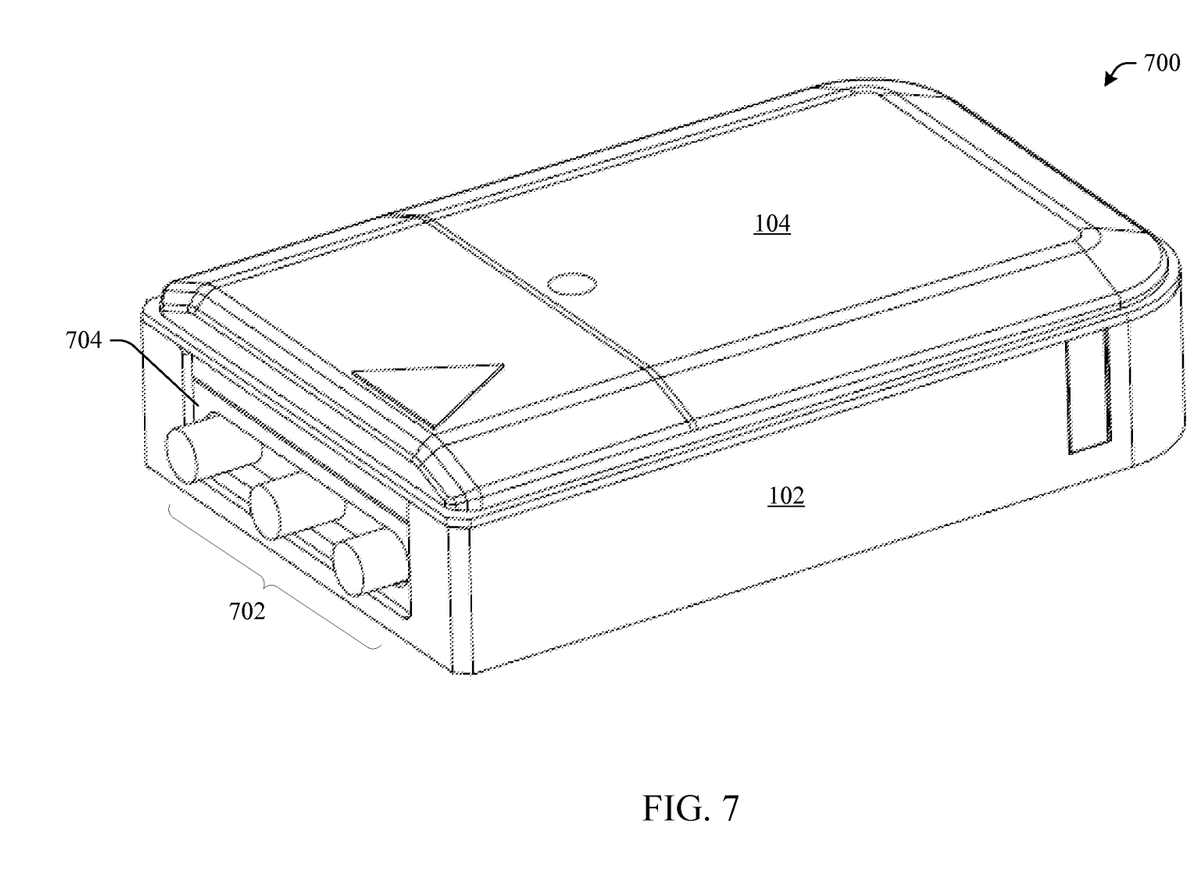
FIG. 7 illustrates a right perspective view of an ACE having coax connections in accordance with aspects of the innovation.

FIG. 7 illustrates yet another variation 700 of the innovation. In the aspect of FIG. 7, the ACE 700 is configured with a four port OR 1×4 (1 input 4 outputs) coax connector block 702. A corresponding adapter plate 704 is employed to install the connector block 702 within the base unit 102.

Figure 8:
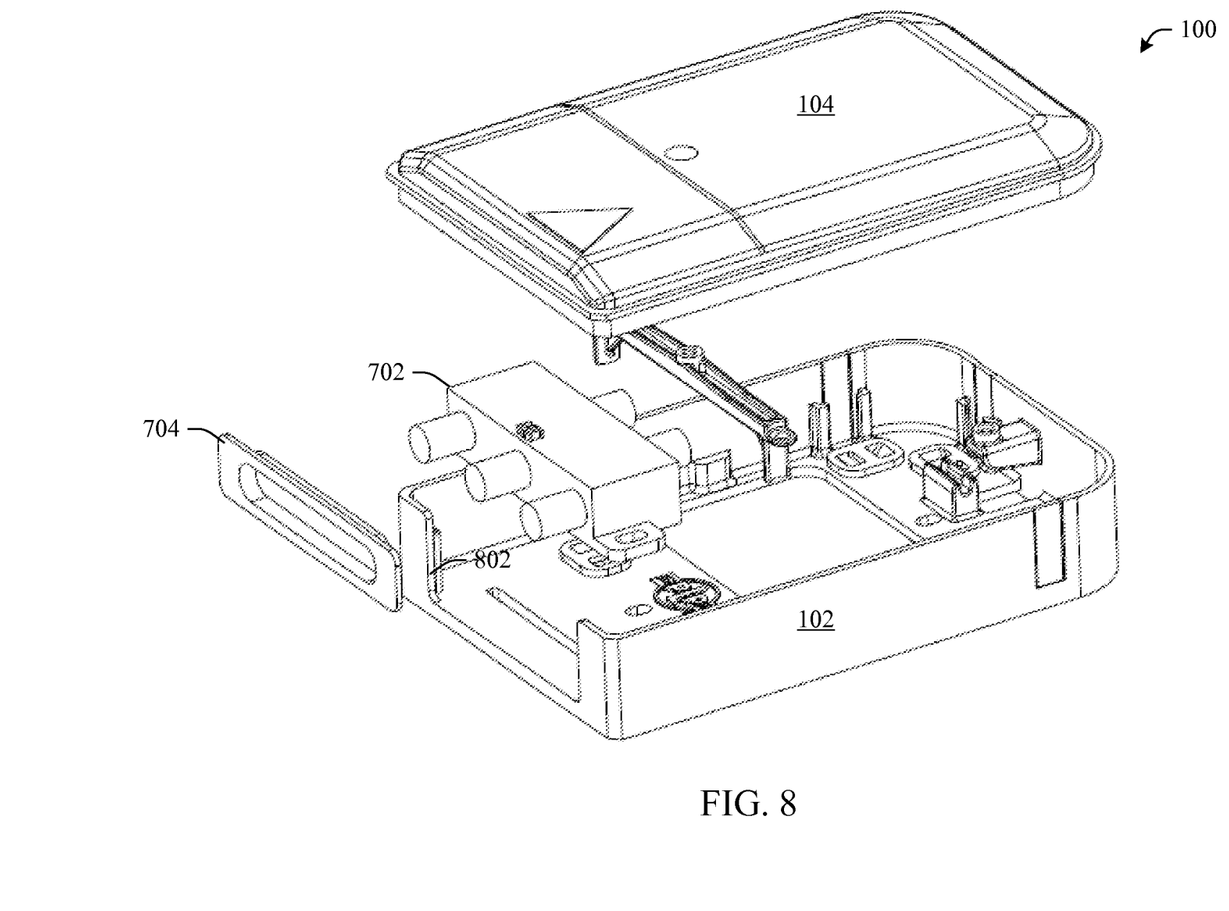
FIG. 8 illustrates an exploded view of the ACE of FIG. 7.

FIG. 8 is an exploded view of ACE 700. As shown, connector block 702 is a four port OR 1×4 coax block. An adapter plate 704 is configured to slidably connect (e.g., via tracks 802) into the aperture of base unit 102. It is to be understood that, if desired, connector block 702 can be reversed such that the location of the input is adjustable as appropriate. This additional variability of the innovation enhances its adaptability to address more configurations without a requirement for additional parts.

While slidable connection is disclosed and claimed herein with regard to embodiments, it is to be understood that the interchangeability and adaptability of the innovation can employ alternative means to position or dispose a connection block. These alternatives are to be included within the scope of this disclosure and claims appended hereto.

Figure 9:
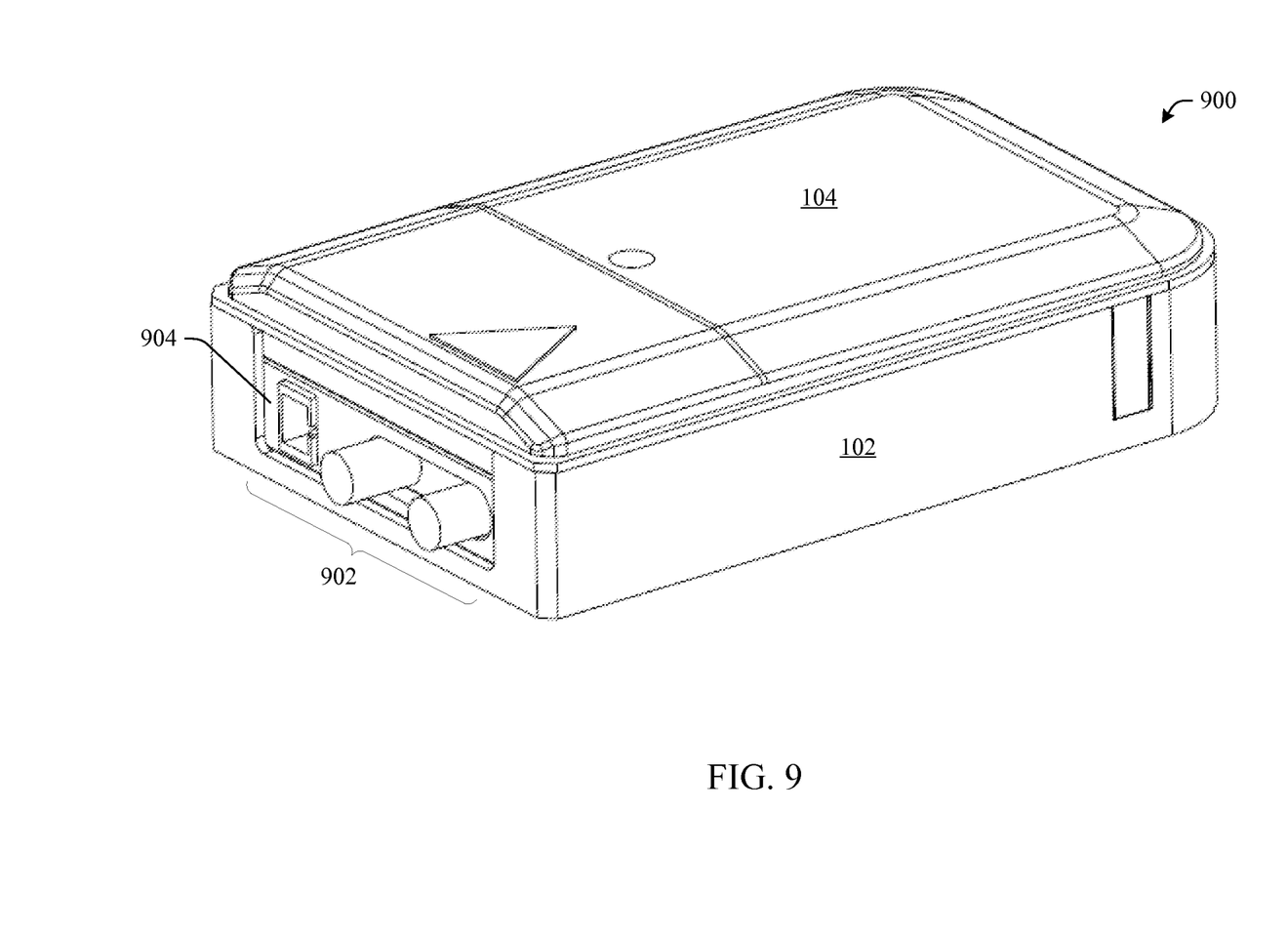
FIG. 9 illustrates a right perspective view of an ACE having fiber and coax connections in accordance with aspects of the innovation.
Figure 10:
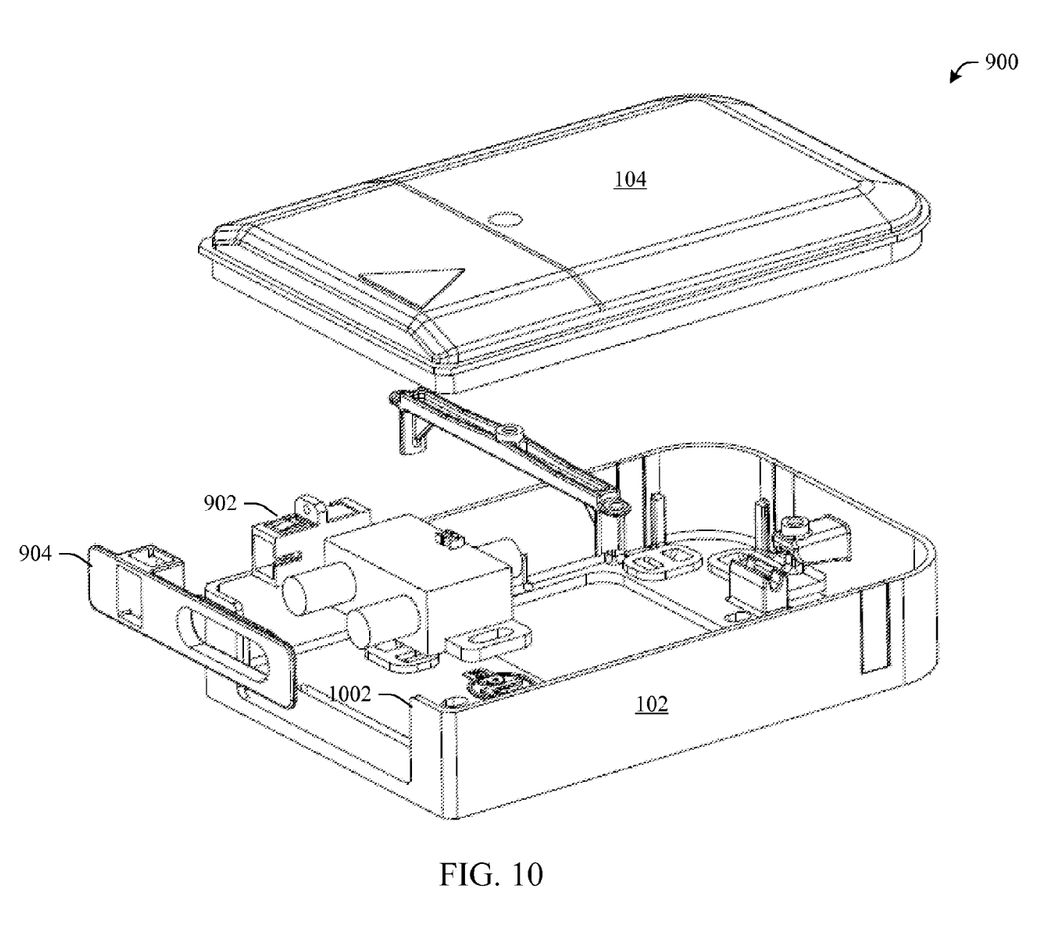
FIG. 10 illustrates an exploded view of the ACE of FIG. 9.

FIGS. 9 and 10 illustrate yet another aspect of an ACE 900 that employs an alternative connector block 902. As shown, a fiber/coax block combination 902 can be employed together with adapter plate 904. As depicted in the exploded view of FIG. 10, ACE 900 can employ a specifically designed adapter plate 904 positioned within the aperture of base unit 102. For example, molded tracks 1002 can be employed to slidably connect the adapter plate 904 (and connector block(s) 902) within the aperture.

As described herein, because the base unit 102 and cover unit 104 can accommodate most any interchangeable connector blocks, inventory can be reduced saving space and costs. As well, a serviceman can equip a truck with only a single housing/cap combination that is capable of most any field application. The features, functions and benefits of such an adaptable ACE will be appreciated by those skilled in the art.

Figure 11:
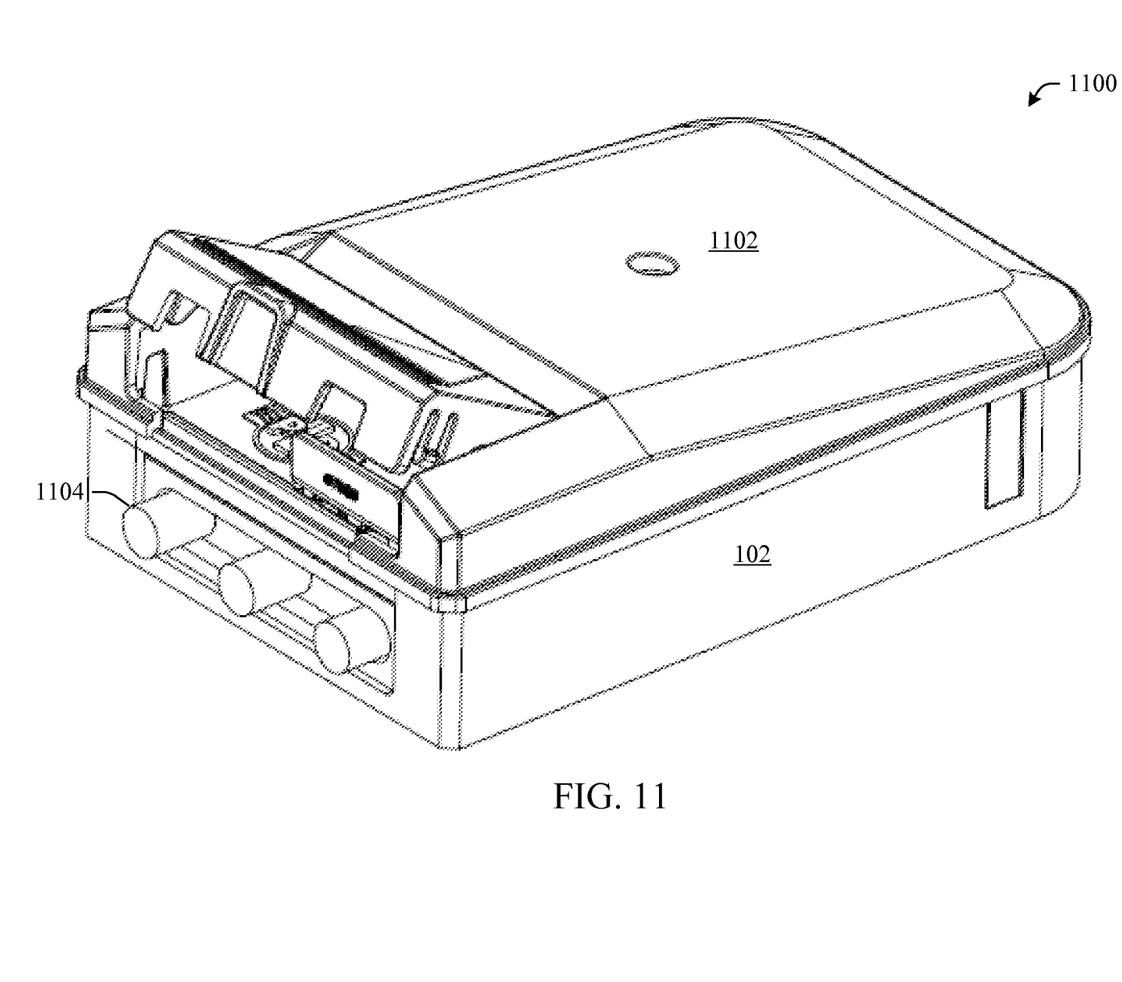
FIG. 11 illustrates a right perspective view of a stackable ACE having coax connections in accordance with aspects of the innovation.

Referring now to FIG. 11, an example ACE 1100 is illustrated in accordance with an aspect of the innovation. Generally, the ACE of FIG. 11 can include the aforementioned base unit 102—thereby conveying adaptability and versatility of the innovation. The base unit 102 can be configured to accept an enclosure unit 1102 as shown. Consistent with the aforementioned discussion, a connector block 1104 can be interchanged as desired or appropriate. Here, in an example ACE 1100, a four port OR 1×4 coax connector block 1104 is employed.

Figure 12:
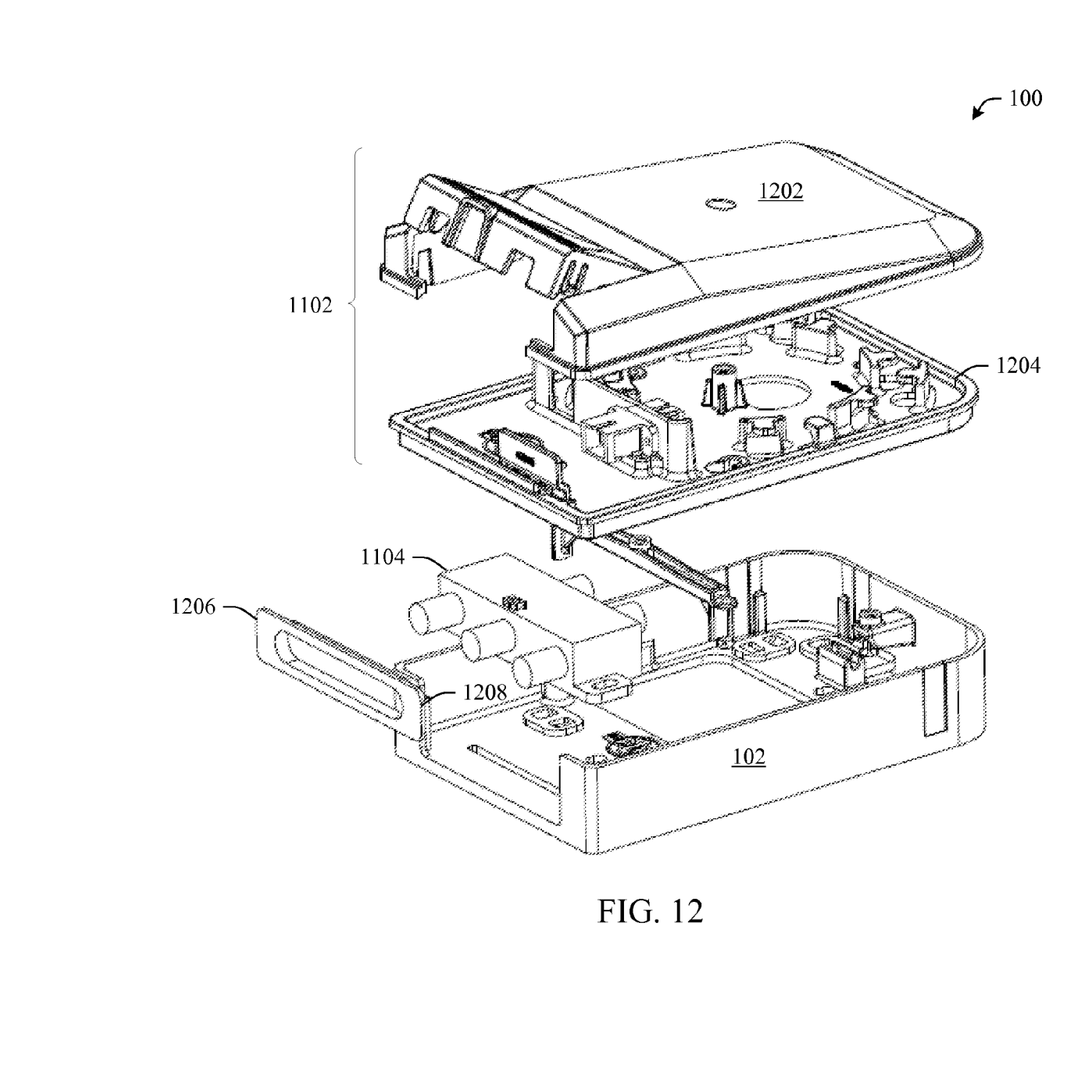
FIG. 12 illustrates an exploded view of the ACE of FIG. 11.

FIG. 12 illustrates an exploded view of ACE 1100. As shown, enclosure unit 1102 can include a top section 1202 and a lower section 1204. In this example, the lower section 1204 can be configured to mate to the top section 1202 as well as to the base unit 102. Further to the discussion supra, an interchangeable adapter plate 1206 can be disposed into an aperture of the base unit 102. In the example, the adapter plate 1206 can be slidably connected into track(s) 1208. Thus, the interchangeable connector block(s) (e.g., 3×2 block 1104) can be positioned in line with the adapter plate 1206 and affixed to the lower surface of the base unit 102.

It will be appreciated that most any adapter plate and/or connector block(s) can be employed in alternative aspects. While specific sizes, shapes, configurations, etc. are shown and described, it is to be understood that most any size, shape and configuration of components (e.g., bases, covers, adapter plates, connector blocks, etc.) can be employed without departing from the features, functions and benefits of the innovation. These variations are to be included within the scope of this disclosure and claims appended hereto.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An enclosure system, comprising:
   a base unit having a bottom surface and three sidewall surfaces, wherein each of the sidewall surfaces are substantially perpendicular to an edge of the bottom surface forming a cavity therein, and wherein one additional sidewall area includes an aperture;
   a plurality of adapter plates configured to be interchangeably disposed within the aperture, wherein each of the adapter plates facilitates a corresponding interchangeable connector block to be employed within the base unit, and wherein each of the plurality of interchangeable adapter plates and corresponding interchangeable connector blocks are configured to be removed and a disparate adapter plate and corresponding disparate connector block disposed within the aperature; and
   a cover unit that encloses the cavity formed by the sidewall surfaces.

2. The enclosure system of claim 1, wherein the corresponding connector block is at least one of a coax, coax/fiber, coax/CAT5, fiber/CAT5, fiber or CAT5 connector block.

3. The enclosure system of claim 1, further comprising an attachment means disposed within an edge of the aperture, wherein the attachment means facilitates connector of each of the adapter plates.

4. The enclosure system of claim 3, wherein the attachment means is a track molded into the edge of the aperture, wherein each of the adapter plates slidably attached within the track.

5. The enclosure system of claim 1, wherein the base unit is a molded plastic base unit.

6. The enclosure system of claim 1, wherein the cover unit is a molded plastic unit that encloses the cavity.

7. The enclosure system of claim 1, wherein the cover is a stackable enclosure configured to mate to the base unit thereby enclosing the cavity.

8. The enclosure system of claim 1, further comprising a seal that protects the cavity from environmental factors.

9. The enclosure system of claim 1, further comprising at least one "knockout" disposed within a sidewall surface, wherein the knock-out facilitates cable entry into the cavity via the sidewall surface.

10. The enclosure system of claim 1, further comprising a fiber splice tray disposed within the cavity.

11. A method for configuring a connection enclosure, comprising:
    selecting one of a plurality of interchangeable connection blocks;
    selecting an adapter plate from a plurality of interchangeable adapter plates, wherein the selected adapter plate corresponds to the selected one of the plurality of connector blocks;

slidably attaching the selected adapter plate into an attachment means disposed within an aperture of a base unit of the connector enclosure; and configuring the one of the plurality of connector blocks through the selected adapter plate;

removing the one of the plurality of connector blocks;

removing the selected adapter plate;

slidably attaching a disparate adapter plate into the attachment means;

configuring a disparate connector block through the disparate adapter plate; and positioning a cover atop the base unit thereby encasing the one of the plurality of connector blocks.

12. The method of claim 11, wherein the attachment means is a molded guide system.

13. The method of claim 11, wherein the one of the plurality of connector blocks is one of a coax, coax/fiber, coax/CAT5, fiber/CAT5, fiber or CAT5 connector block.

14. The method of claim 11, wherein the disparate connector block of a type different from the one of the plurality of connection blocks, and wherein the disparate connector block is selected from a coax, coax/fiber, coax/CAT5, fiber/CAT5, fiber or CAT5 connector block.

15. The method of claim 11, wherein the cover is a stackable enclosure that mates to a top opening of the base unit.

16. A cable connection system, comprising:

an adaptable connection enclosure housing that is capable of accepting a plurality of interchangeable connector blocks; and a plurality of adapter plates that slidably and interchangeably attach to the adaptable connection enclosure, wherein each of the plurality of interchangeable adapter plates corresponds to at least one of the plurality of interchangeable connector blocks, and wherein the plurality of adapter plates and corresponding connector blocks are configured to be removed and a disparate adapter plate and corresponding disparate connector block slidably attached to the adaptable connection enclosure.

17. The cable connection system of claim 16, wherein the plurality of connector blocks includes coax, coax/fiber, coax/CAT5, fiber/CAT5, fiber or CAT5 connector blocks, or combinations thereof.

18. The cable connection system of claim 17, further comprising a fiber splice tray, wherein the fiber splice tray is housed within the housing along with at least one of the plurality of connector blocks.

19. The cable connection system of claim 17, wherein the housing includes a base portion having a plurality of knockouts that support surface cable entry and a hermetically sealed cover portion that attaches to the base portion formatting a cavity therebetween.

* * * * *